United States Patent
Alasry et al.

(10) Patent No.: US 9,925,872 B1
(45) Date of Patent: Mar. 27, 2018

(54) SYSTEM FOR MONITORING DRIVER ALERTNESS AND ADAPTING VEHICLE SETTINGS THERETO

(71) Applicants: DENSO International America, Inc., Southfield, MI (US); DENSO CORPORATION, Kariya-shi, Aichi-ken (JP)

(72) Inventors: Bilal Alasry, Dearborn, MI (US); Doua Vang, Waterford, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/350,415

(22) Filed: Nov. 14, 2016

(51) Int. Cl.
*B60W 50/14* (2012.01)
*B60K 28/06* (2006.01)

(52) U.S. Cl.
CPC .................... *B60K 28/06* (2013.01)

(58) Field of Classification Search
CPC ............. G05D 1/006; B60W 50/14; B60W 2040/0818; B60W 2040/0827; B60W 2040/0872
USPC .................................. 340/575, 576
See application file for complete search history.

(56) References Cited

U.S. PATENT DOCUMENTS

| 7,138,923 | B2 | 11/2006 | Ferrone et al. |
| 8,698,639 | B2 | 4/2014 | Fung et al. |
| 2003/0149545 | A1 | 8/2003 | Shu et al. |
| 2004/0073367 | A1 | 4/2004 | Altan et al. |
| 2005/0030184 | A1 | 2/2005 | Victor |
| 2005/0143884 | A1 | 6/2005 | Bihler et al. |
| 2006/0259206 | A1 | 11/2006 | Smith et al. |
| 2007/0182529 | A1 | 8/2007 | Dobler et al. |
| 2008/0167820 | A1 | 7/2008 | Oguchi et al. |
| 2008/0183388 | A1 | 7/2008 | Goodrich |
| 2010/0030434 | A1 | 2/2010 | Okabe et al. |
| 2013/0070043 | A1 | 3/2013 | Geva et al. |
| 2013/0194099 | A1 | 8/2013 | Nagata |
| 2013/0274985 | A1* | 10/2013 | Lee .................. B60W 10/20 701/23 |
| 2014/0046546 | A1 | 2/2014 | Kollegger et al. |
| 2014/0222253 | A1 | 8/2014 | Siegel et al. |
| 2014/0244096 | A1 | 8/2014 | An et al. |
| 2014/0276112 | A1 | 9/2014 | Fung et al. |
| 2014/0358327 | A1 | 12/2014 | Nordbruch |
| 2015/0094907 | A1 | 4/2015 | Offenhaeuser et al. |
| 2015/0110402 | A1 | 4/2015 | Offenhaeuser et al. |
| 2015/0294547 | A1 | 10/2015 | Ito et al. |
| 2015/0328985 | A1 | 11/2015 | Kim et al. |
| 2015/0351681 | A1 | 12/2015 | Lee et al. |

(Continued)

FOREIGN PATENT DOCUMENTS

WO    WO-2015174963 A1    11/2015

*Primary Examiner* — Kevin Kim
(74) *Attorney, Agent, or Firm* — Harness, Dickey & Pierce, P.L.C.

(57) ABSTRACT

A driver alertness detection system. The system is configured to activate an autonomous drive module of the vehicle to autonomously drive the vehicle when the measured alertness level of the driver is less than a predetermined threshold, and deactivate the autonomous drive module of the vehicle to permit manual driving when the measured alertness level of the driver is equal to or greater than the predetermined threshold.

19 Claims, 2 Drawing Sheets

(56) References Cited

U.S. PATENT DOCUMENTS

| | | |
|---|---|---|
| 2016/0039424 A1 | 2/2016 | Hong et al. |
| 2017/0106876 A1* | 4/2017 | Gordon ............... B60W 50/082 |
| 2017/0131715 A1* | 5/2017 | Ryu ..................... G05D 1/0061 |

* cited by examiner

SYSTEM FOR MONITORING DRIVER ALERTNESS AND ADAPTING VEHICLE SETTINGS THERETO

FIELD

The present disclosure relates to a system for monitoring a driver's alertness and adapting vehicle settings thereto.

BACKGROUND

This section provides background information related to the present disclosure, which is not necessarily prior art.

Autonomous drive systems are expected to become more and more popular with consumers in the upcoming years. The present teachings advantageously provide for systems and methods for monitoring a driver's alertness level and adapting vehicle settings to the driver's alertness level, the vehicle settings including autonomous drive settings. The present teachings provide numerous advantages as described herein and as one skilled in the art will appreciate.

SUMMARY

This section provides a general summary of the disclosure, and is not a comprehensive disclosure of its full scope or all of its features.

The present teachings include a driver alertness detection system. The system is configured to activate an autonomous drive module of the vehicle to autonomously drive the vehicle when the measured alertness level of the driver is less than a predetermined threshold, and deactivate the autonomous drive module of the vehicle to permit manual driving when the measured alertness level of the driver is equal to or greater than the predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
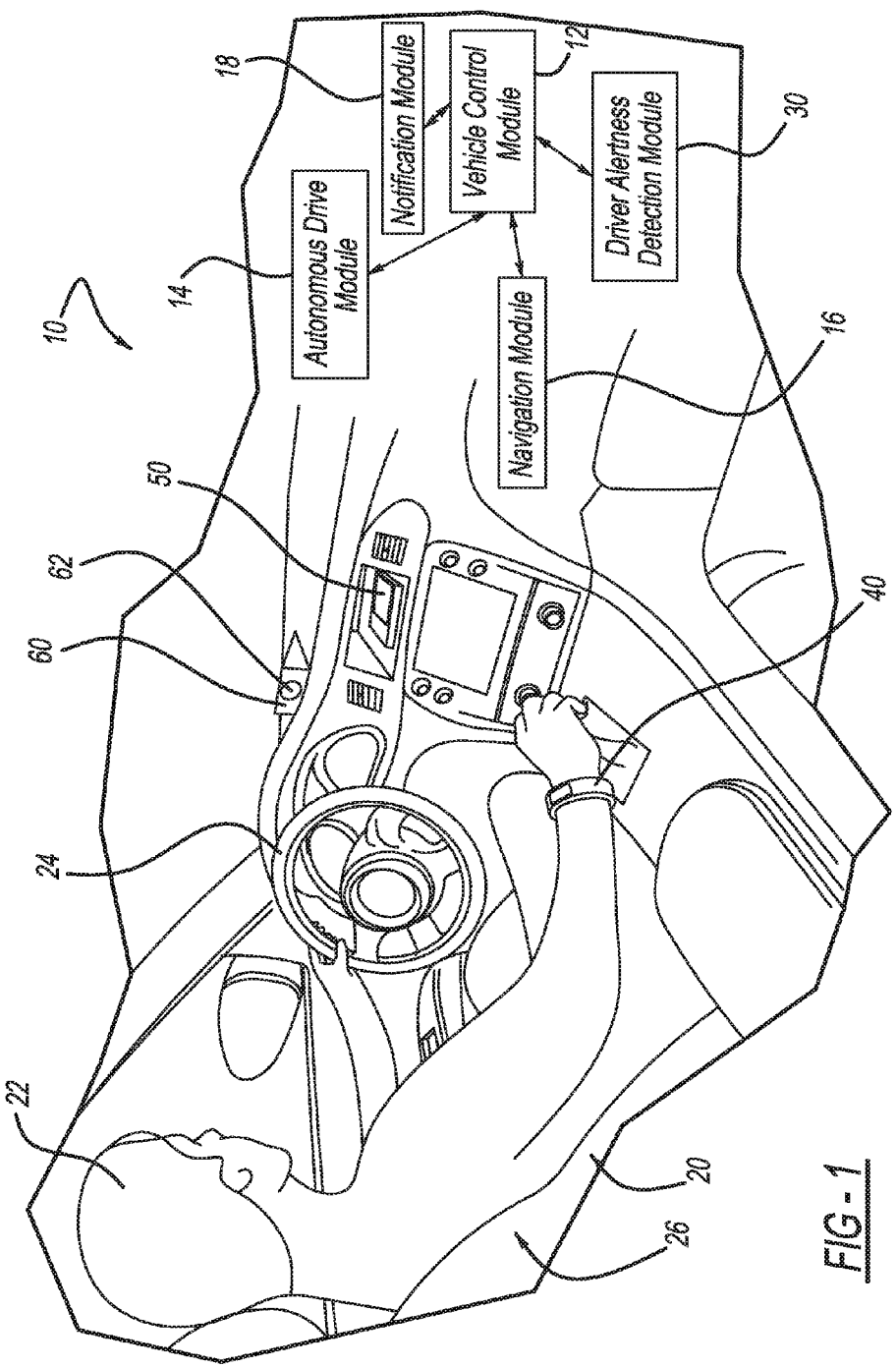
Figure 2:
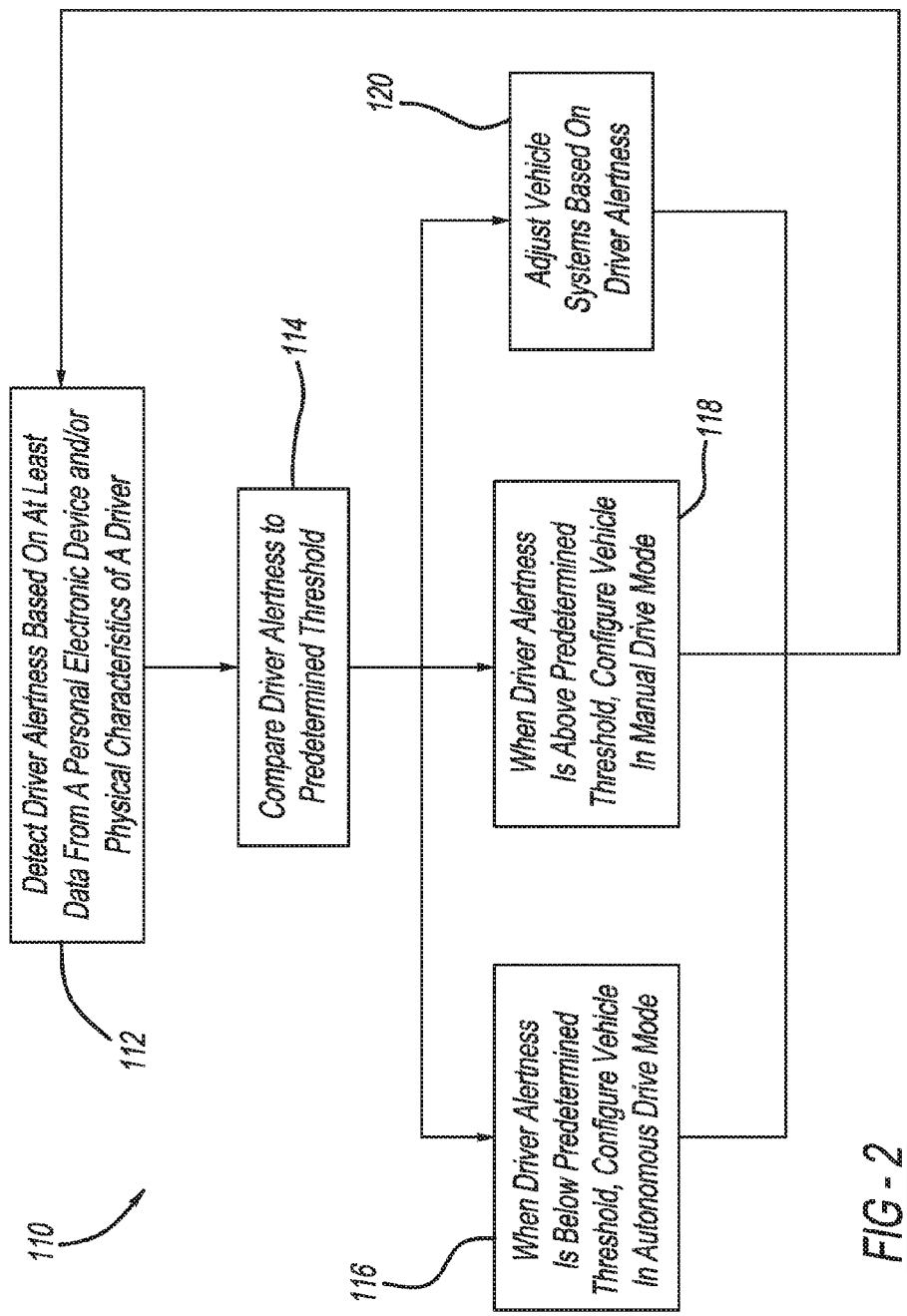

FIG. 1 illustrates a driver alertness system according to the present teachings; and FIG. 2 illustrates a method according to the present teachings for configuring vehicle systems based on driver alertness.

Corresponding reference numerals indicate corresponding parts throughout the several views of the drawings.

DETAILED DESCRIPTION

Example embodiments will now be described more fully with reference to the accompanying drawings.

FIG. 1 illustrates a driver alertness detection system according to the present teachings at reference numeral 10. The system 10 generally includes a vehicle control module 12, which is in communication with an autonomous drive module 14, a navigation module 16, a notification module 18, and a driver alertness detection module 30. The system 10 is configured for use with any suitable vehicle, such as a passenger vehicle 20 as illustrated, a mass transit vehicle, an off-road vehicle, any suitable utility vehicle, construction equipment, manufacturing equipment, watercraft, aircraft, etc. Each one of the modules 12, 14, 16, 18, and 30 can be arranged at any suitable position about the vehicle 20.

In this application the term "module" may be replaced with the terms "circuit" or "controller." The term "module" may refer to, be part of, or include processor hardware (shared, dedicated, or group) that executes code and memory hardware (shared, dedicated, or group) that stores code executed by the processor hardware. The code is configured to provide the features of the modules, controllers, methods, and systems described herein. The term memory hardware is a subset of the term computer-readable medium. The term computer-readable medium, as used herein, does not encompass transitory electrical or electromagnetic signals propagating through a medium, such as on a carrier wave. The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The vehicle control module 12 is configured to control various systems and features of the vehicle 20 as described herein. For example, the vehicle control module 12 is configured to control and/or include any suitable adaptive cruise control system for the vehicle 20, any suitable collision warning system, any suitable lane keep assist system, any suitable lane departure warning system, and any suitable blind spot warning system. Furthermore, the vehicle control module 12 is in communication with, is configured to receive data from, and is configured to control each one of the autonomous drive module 14, the navigation module 16, the notification module 18, and the driver alertness detection module 30.

The autonomous drive module 14 can be any suitable module configured to autonomously drive the vehicle 20. The navigation module 16 can be any suitable module configured to navigate the vehicle 20, such as by providing navigational instructions to a driver 22 of the vehicle 20, or providing navigation instructions to the autonomous drive module 14. The navigation instructions can be provided from any suitable source onboard the vehicle 20 or remote to the vehicle 20. The notification module 18 is configured to notify the driver 22 of the status of the driver alertness detection system 10 in any suitable manner, such as with any suitable audible notification and/or any suitable visual notification, such as on a heads-up display, dashboard display screen, and/or center console display.

The driver alertness detection module 30 is configured to measure an alertness level of the driver 22 of the vehicle 20, and compare the measured driver alertness level to a predetermined threshold. The driver alertness detection module 30 is configured to measure the alertness of the driver in any suitable manner. For example, the driver alertness detection module 30 is configured to receive data from any suitable electronic device of the driver 22, such as wearable electronic device 40 and/or smartphone 50, for example. The driver alertness detection module 30 is also configured to receive data regarding the alertness of the driver 22 from a driver status monitor 60. With reference to FIG. 2, an exemplary method according to the present teachings is illustrated at reference numeral 110. At block 112, the driver alertness detection module 30 detects driver alertness based on at least data from the wearable electronic device 40, the smartphone 50, and/or the driver status monitor 60, for example. At block 114, the driver alertness detection module 30 compares the measured driver alertness to a predetermined threshold, as explained herein.

The wearable electronic device 40 can be any suitable electronic device, such as a bracelet or watch for example, configured to gather and store any suitable alertness data for the driver 22 and monitor the alertness of the driver 22 in any suitable manner. For example, the wearable electronic device 40 can be configured to monitor alertness data including one or more of the driver's heartrate, blood pressure, sleep history, rest history, general activity and movement history (including operating vehicle systems such as the radio, touchscreen, navigation, etc.). The wearable electronic device 40 can also include alertness data such as the driver's travel schedule and appointment schedule, which can be input to the wearable electronic device 40 in any suitable manner from any suitable source, such as from the driver 22 herself or himself; or downloaded to the wearable electronic device 40 from the driver's appointment calendar, email, etc. (such as from the driver's smartphone 50, personal computer, tablet, the Internet, etc.). The driver alertness detection module 30 is configured to download this alertness data in any suitable manner from the wearable electronic device 40 to measure an alertness level of the driver 22, as described herein and set forth at block 112 of FIG. 2.

The smartphone 50 is configured to gather and store any suitable alertness data for the driver 22 and monitor the alertness of the driver 22 in any suitable manner. For example, the smartphone 50 can be configured to monitor alertness data including one or more of the driver's heartrate, blood pressure, sleep history, rest history, general activity and movement history (including operating vehicle systems including the radio, touchscreen, navigation, etc.), either directly or by way of a device worn by the driver 22, such as the wearable electronic device 40 or any other suitable monitoring device. The smartphone 50 can also include alertness data, such as the driver's travel schedule and appointment schedule, which can be input to the smartphone 50 in any suitable manner from any source, such as from the driver 22 herself or himself; or downloaded to the smartphone 50 from the driver's appointment calendar, email, etc. (such as from the driver's personal computer, tablet, the Internet, etc.). The driver alertness detection module 30 is configured to download this alertness data in any suitable manner from the smartphone 50 to measure an alertness level of the driver 22, as described herein and set forth at block 112 of FIG. 2.

The driver alertness detection module 30 is also configured to download alertness data from the driver status monitor (DSM) 60 (also included in block 112 of FIG. 2). The DSM 60 can be arranged in front of the driver 22, such as behind the steering wheel 24, or at any other suitable position within passenger cabin 26. The DSM 60 can include any suitable number of sensors 62. The sensors 62 can be any suitable sensors to monitor the driver 22, such as the driver's eye position and movement, head position and movement, facial expressions, etc. For example, the sensors 62 can include a camera, infrared light-emitting diodes (LEDs) and infrared sensors. The DSM 60 includes a control module configured to receive facial data sensed by the sensors 62, including images of the driver's face, head, and/or eyes. The control module then analyzes the facial data to determine the face angle, head position, and/or eye position of the driver 22, as well as detect long-duration eye closure of the driver 22, and to estimate an alertness level of the driver 22. A further description of the DSM 60 is found in U.S. Pat. No. 9,308,914 (filed Jan. 23, 2015, and issued Apr. 12, 2016), and U.S. patent application Ser. No. 15/224,949 (filed Aug. 1, 2016), both of which are assigned to DENSO International America, Inc. and both of which are incorporated herein by reference in their entirety.

The driver alertness detection module 30 is configured to process the data received from one or more of the wearable electronic device 40, the smartphone 50, and the DSM 60 to measure an alertness level of the driver 22. The alertness level of the driver 22 can be measured in any suitable manner. For example, the driver alertness detection module 30 can be configured to measure an alertness level of the driver 22 based on an alertness scale including one or more predetermined thresholds (see block 114 of FIG. 2), such as on a scale of 1 to 5, for example, in which an alertness ranking of "5" means that the driver 22 is fully alert, and an alertness ranking of "1" means that the driver 22 is asleep or otherwise unable to operate the vehicle 20 at all. For example, the driver alertness detection module 30 may assign an alertness level of "5" when based on data from the personal electronic devices 40 and/or 50, and/or the DSM 60, the driver alertness detection module 30 determines that the driver 22 is completely alert and not drowsy at all, such as due to a full night's sleep, an open calendar with no appointments or trips, wide-open eyes with rapidly responsive eye movements, a heartrate or pulse indicative of complete alertness, or otherwise. The driver alertness detection module 30 may assign an alertness level of "1" when based on data from the personal electronic devices 40 and/or 50, and/or the DSM 60, the driver alertness detection module 30 determines that the driver 22 is asleep or otherwise unable to operate the vehicle 20, such as because the driver's eyes have remained closed for an extended period of time and/or the driver's heartrate and/or other measured vital signs indicate that the driver 22 is asleep.

The driver alertness detection module 30 is configured to assign alertness levels of 2, 3, and 4 based on varying degrees of alertness. For example, the driver alertness detection module 30 may assign an alertness level of "4" when based on data from the personal electronic devices 40 and/or 50 the driver alertness detection module 30 determines that the driver 22 had a poor night's sleep and/or had an early appointment, and thus may not be completely alert. The driver alertness detection module 30 may assign an alertness level of "3" when based on data from the personal electronic devices 40 and/or 50, and/or the DSM 60, the driver alertness detection module 30 determines that the driver 22 is less alert than alertness level "4," such as due to an early and full morning of appointments, less than five hours of sleep, and less responsive eye movements as compared to alertness level "4." The driver alertness detection module 30 may assign an alertness level of "2" when based on data from the personal electronic devices 40 and/or 50, and/or the DSM 60, the driver alertness detection module 30 determines that the driver 22 is less alert than alertness level "3," such as due to waking up earlier than usual, nonstop appointments from 7 AM to 7 PM, little or no sleep, and less responsive eye movements as compared to alertness level "3," including moments where the driver's eyes close for an unsafe period of time.

The vehicle control module 12 configures settings of the vehicle 20 based on the alertness level detected by the driver alertness detection module 30, and a comparison of the alertness level to one or more predetermined thresholds (see block 114 of FIG. 2). For example and with reference to block 116 of FIG. 2, if the driver alertness detection module 30 detects the alertness level as level "1," and the autonomous drive module 14 is not activated, then the vehicle control module 12 will activate the autonomous drive module 14 to take over drive control of the vehicle 20 since the driver 22 is unable to operate the vehicle at all. For example and with reference to block 118 of FIG. 2, if the driver alertness detection module 30 detects the alertness level as level "5," then the vehicle control module 12 will operate the vehicle 20 in a standard manner, and the autonomous drive module 14 will not be activated unless manually activated by the driver 22.

If the driver alertness detection module 30 detects the alertness level as level "4," then the vehicle control module 12 can take preliminary action to facilitate operation of the vehicle 20 for the driver 22. When the driver alertness detection module 30 detects the alertness level as "3" or "2," then the vehicle control module 12 can take additional action to facilitate operation of the vehicle 20 or take autonomous control of the vehicle 20. For example and with reference to block 120 of FIG. 2, the vehicle control module 12 may adjust vehicle settings by performing one or more of the following as the detected alertness level moves lower (and thus the alertness of the driver 22 decreases), such as from 4 to 3, or from 3 to 2: increase the adaptive cruise control following distance if adaptive cruise control is engaged so that there is more distance between the vehicle 20 and a lead vehicle; increase a distance threshold for providing a collision warning to the driver 22 such that the driver 22 is warned of a possible collision earlier; activate a lane keep assist system so that the vehicle control module 12 steers the vehicle 20 and operates the brakes of the vehicle 20 to keep the vehicle 20 in its current lane; activate a lane departure warning so that the driver 22 receives a notification from the notification module 18 when the vehicle 20 is about to depart from its lane; activate a blind spot warning system to notify the driver, such as by way of the notification module 18, when a vehicle is in the blind spot of the vehicle 20; command the navigation module 16 to reroute the vehicle 20 to a route having less traffic and reduced speeds, which makes it easier for a drowsy person to navigate; and increase the frequency and/or intensity of notifications to the driver 22 generated by the notification module 18 to make sure that the driver 22 is aware of the notifications.

The vehicle control module 12 may adjust vehicle settings by performing one or more of the following as the detected alertness level moves higher (and thus the driver 22 becomes more alert), such as from 2 to 3, or from 3 to 4: decrease the adaptive cruise control following distance if adaptive cruise control is engaged so that there may be less distance between the vehicle 20 and a lead vehicle; increase a distance threshold for providing a collision warning to the driver 22 since the driver 22 does not need to be informed of a collision as early as before; deactivate the lane keep assist system; deactivate the lane departure warning; deactivate the blind spot warning system; command the navigation module 16 to reroute the vehicle 20 to the most direct route regardless of speed and route complexity since the driver 22 will be more alert; and decrease the frequency and/or intensity of notifications to the driver 22 generated by the notification module 18 to make sure that the driver 22 is aware of the notifications.

With respect to autonomous control and with reference to blocks 116 and 118 of FIG. 2, the vehicle control module 12 instructs the autonomous drive module 14 to take different levels of autonomous control based on the determined alertness level. For example, if the determined alertness level is 1 (meaning that the driver 22 is asleep or otherwise not alert at all), the control module 12 will instruct the autonomous drive module 14 to take complete autonomous control of the vehicle 20. If the determined alertness level is 5 (meaning that the driver 22 is completely alert), the control module 12 will instruct the autonomous drive module 14 to not take any control of the vehicle 20, and thus the driver 22 will have complete manual control of the vehicle 20. If the determined alertness level is between 1 and 5, the control module 12 can instruct the autonomous drive module 14 to take various levels of autonomous control. For example, if the determined alertness level is 4, the control module 12 can instruct the autonomous drive module 14 to control braking of the vehicle 20 to lessen the possibility of a collision, while giving the driver 22 control over all other aspects of driving the vehicle 20. If the determined alertness level is 3, in addition to braking the control module 12 can control acceleration of the vehicle 20, while still giving the driver 22 control of steering, for example. If the determined alertness level is 2, the vehicle control module 12 can further control steering to maintain the vehicle 20 in a given lane, but allow the driver 22 to turn the steering wheel 24 to turn the wheels to change lanes and/or the route of the vehicle 20, for example.

To facilitate the transition between autonomous drive and manual drive, the vehicle control module 12 is configured to suspend the connection between the steering wheel 24 and the wheels of the vehicle 20. For example, when the autonomous drive module 14 is being disengaged to restore manual drive (such as when the driver alertness level increases to or towards 5, or the vehicle 20 enters an area where autonomous drive is not available or autonomous capabilities are restricted, such as due to lack of GPS availability or when the vehicle 20 is off-road), the vehicle control module 12 can be configured to momentarily disconnect the steering wheel 24 from the wheels until the driver 22 can fully understand the state of the steering system (such as the relative positions of the steering wheel 24 and the wheels) and level of autonomous drive. Then the steering operation of the front wheels can be restored. Additionally or alternatively, the vehicle control module 12 can be configured to increase the stiffness (or torque) of the steering wheel 24 so that more torque is required to turn the wheel 24. As a result, the driver 22 will be prevented from steering the wheel 24 too aggressively when the autonomous drive module 14 partially or fully restores manual drive. After a predetermined period of time during which the driver 22 is able to obtain a better frame of reference regarding the amount of force needed to maintain a current vehicle heading, the normal torque settings of the steering wheel 24 can be restored.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A driver alertness detection system comprising:
    an alertness detection module configured to measure an alertness level of a driver of a vehicle, and compare the measured driver alertness level to at least one predetermined threshold; and
    a vehicle control module configured to activate an autonomous drive module of the vehicle to autonomously drive the vehicle when the measured alertness level of the driver is less than a predetermined threshold, and deactivate the autonomous drive module of the vehicle to permit manual driving when the measured alertness level of the driver is equal to or greater than the predetermined threshold;
    wherein the vehicle control module is configured to, for a predetermined period of time when the autonomous drive module is deactivated, suspend a connection between a steering wheel of the vehicle and wheels of the vehicle such that rotation of the steering wheel does not rotate the wheels.

2. The driver alertness detection system of claim 1, wherein the alertness detection module is configured to measure the alertness level of the driver based on data from a personal electronic device of the driver.

3. The driver alertness detection system of claim 2, wherein the personal electronic device includes at least one of a wearable electronic device and a smartphone.

4. The driver alertness detection system of claim 2, wherein the data includes one or more of the following: sleep history of the driver; rest history of the driver; activity history of the driver; travel schedule of the driver; and appointment schedule of the driver.

5. The driver alertness detection system of claim 1, wherein the alertness detection module is configured to measure the alertness level of the driver based on at least one of head position and eye position of the driver.

6. The driver alertness detection system of claim 1, wherein based on the measured alertness level, the vehicle control module is configured to adjust driving parameters including one or more of the following:
    increase or decrease adaptive cruise control following distance;
    increase or decrease distance threshold for collision warning;
    activate or deactivate lane keep assist system;
    activate or deactivate lane departure warning;
    activate or deactivate blind spot warning system;
    command navigation module to reroute the vehicle to a route having at least one of less traffic and lower speeds;
    increase or decrease frequency of notifications to the driver; and
    increase or decrease intensity of notifications to the driver.

7. The driver alertness detection system of claim 1, wherein the vehicle control module is configured to, for a predetermined period of time when the autonomous drive module is activated or deactivated, increase stiffness of a steering wheel of the vehicle from a first level at which a first amount of torque is required to turn the steering wheel a turn distance to a second level at which a second amount of torque greater than the first amount of torque is required to turn the steering wheel the turn distance.

8. The driver alertness detection system of claim 1, wherein the vehicle control module is configured to deactivate the autonomous drive module when the driver has exhibited constant movement to operate vehicle systems including at least one of a radio and touchscreen.

9. The driver alertness detection system of claim 1, wherein the vehicle control module is configured to deactivate the autonomous drive module when the autonomous drive module is unable to autonomously drive the vehicle.

10. A method for configuring vehicle systems based on driver alertness, the method comprising:
    measuring an alertness level of a driver of a vehicle, and comparing the measured alertness level to a predetermined threshold;
    activating an autonomous drive module of the vehicle to autonomously drive the vehicle when the measured alertness level of the driver is less than a predetermined threshold;
    deactivating the autonomous drive module of the vehicle to permit manual driving when the measured alertness level of the driver is equal to, or greater than, the predetermined threshold; and
    suspending a connection between a steering wheel of the vehicle and wheels of the vehicle such that rotation of the steering wheel does not rotate the wheels for a predetermined period of time when the autonomous drive module is activated or deactivated.

11. The method of claim 10, further comprising measuring the alertness level of the driver based on data from a personal electronic device of the driver.

12. The method of claim 11, wherein the personal electronic device includes at least one of a wearable electronic device and a smartphone.

13. The method of claim 11, wherein the data includes one or more of the following: sleep history of the driver; rest history of the driver; activity history of the driver; travel schedule of the driver; and appointment schedule of the driver.

14. The method of claim 10, further comprising measuring the alertness level of the driver based on at least one of head position and eye position of the driver.

15. The method of claim 10, further comprising adjusting driving parameters based on the measured alertness level, including one or more of the following:
    increasing or decreasing adaptive cruise control following distance;
    increasing or decreasing distance threshold for collision warning;
    activating or deactivating lane keep assist warning;
    activating or deactivating lane departure warning;
    activating or deactivating blind spot warning system;
    rerouting the vehicle to a route having at least one of less traffic and lower speeds;
    increasing or decreasing frequency of notifications to the driver; and
    increasing or decreasing intensity of notifications to the driver.

16. The method of claim 10, further comprising, for a predetermined period of time when the autonomous drive module is activated or deactivated, increasing stiffness of a steering wheel of the vehicle from a first level at which a first amount of torque is required to turn the steering wheel a turn distance to a second level at which a second amount of torque greater than the first amount of torque is required to turn the steering wheel the turn distance.

17. The method of claim 10, further comprising deactivating the autonomous drive module when the driver has exhibited constant movement to operate vehicle systems including at least one of a radio and touchscreen.

18. The method of claim 10, further comprising deactivating the autonomous drive module when the autonomous drive module is unable to autonomously drive the vehicle.

19. A driver alertness detection system comprising:
    an alertness detection module configured to measure an alertness level of a driver of a vehicle, and compare the measured driver alertness level to at least one predetermined threshold; and
    a vehicle control module configured to activate an autonomous drive module of the vehicle to autonomously drive the vehicle when the measured alertness level of the driver is less than a predetermined threshold, and deactivate the autonomous drive module of the vehicle to permit manual driving when the measured alertness level of the driver is equal to or greater than the predetermined threshold;
    wherein the vehicle control module is configured to, for a predetermined period of time when the autonomous drive module is activated or deactivated, increase stiffness of a steering wheel of the vehicle from a first level at which a first amount of torque is required to turn the steering wheel a turn distance to a second level at which a second amount of torque greater than the first amount of torque is required to turn the steering wheel the turn distance.

* * * * *